(12) United States Patent  
Santoru et al.

(10) Patent No.: US 7,715,786 B2  
(45) Date of Patent: May 11, 2010

(54) BLIND IDENTIFICATION OF ADVANCED MODULATION AND CODING MODES

(75) Inventors: Joseph Santoru, Agoura Hills, CA (US); Guangcai Zhou, Agoura Hills, CA (US); Ernest C. Chen, San Pedro, CA (US); Dennis Lai, Cerritos, CA (US); Shamik Maitra, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 603 days.

(21) Appl. No.: 11/672,461

(22) Filed: Feb. 7, 2007

(65) Prior Publication Data

US 2007/0206638 A1    Sep. 6, 2007

Related U.S. Application Data

(60) Provisional application No. 60/771,394, filed on Feb. 8, 2006.

(51) Int. Cl.  
*H04Q 7/32* (2006.01)

(52) U.S. Cl. .............. 455/12.1; 455/11.1; 455/13.1; 455/13.2; 455/427; 455/13.3; 370/315; 370/316; 370/320; 370/323; 725/63; 725/67; 725/72; 725/68; 380/210; 380/211

(58) Field of Classification Search ........... 455/12.1, 455/13.1, 13.2, 13.3, 427, 11.1, 500, 517, 455/426.1, 466, 426.2, 24; 370/725, 315, 370/316, 320, 323; 725/63, 67, 72, 68; 380/210, 380/211, 42  
See application file for complete search history.

(56) References Cited

U.S. PATENT DOCUMENTS 4,262,356 A * 4/1981 Lautier et al. ............... 370/323

6,574,235 B1    6/2003 Arslan et al.  
2004/0252725 A1  12/2004 Sun et al.  
2006/0215785 A1   9/2006 Chen et al.

FOREIGN PATENT DOCUMENTS

| GB | 2351422 | 12/2000 |
|---|---|---|
| WO | 01/58041 | 8/2001 |
| WO | 2005022758 A2 | 3/2005 |
| WO | 2005/101839 | 10/2005 |
| WO | 2005/101840 | 10/2005 |

OTHER PUBLICATIONS

Partial European Search Report dated Oct. 9, 2009 in European Patent Application No. 07250512 filed Feb. 8, 2007 by Joseph Santoru et al.  
ETSI TR 102 376 VI.1.1; "Digital Video Broadcasting (DVB) User Guidelines for the Second Generation System for Broadcasting, Interactive Services, News Gathering and Other Broadband Satellite Applications (DVB-S2)"; Feb. 2005; Sophia Antipolis, France; XP014027139; Annex B, section B.1, Annex C, sections C.3.1 and C.3.2, p. 17, line 10.  
Horii, Akihiro; Shiraishi, Kenichi; Shinjo, Soichi; Suzuki, Shoichi; Takegahara, Toshiyuki; "Practical Design of Receiver for Satellite Digital Broadcasting"; International Conference on Consumer Electronics; Jun. 2, 1998; New York, New York, USA; XP010282972; figure 1; pp. 68-69.  
Extended European search report dated Dec. 22, 2009 in European Patent Application No. 07250512.6 filed Feb. 8, 2007 by Joseph Santoru et al.

* cited by examiner

*Primary Examiner*—Keith T Ferguson

(57) ABSTRACT

Methods and apparatuses for acquiring and demodulating a data stream transmitted in a communication system. A method in accordance with the present invention comprises finding a boundary of a physical layer frame (PLFrame) in the data stream, finding a first 26 bits of a Unique Word (UW) associated with the data stream, finding a scrambling code utilizing the UW, and using a decoding procedure to determine a modulation type and code rate used for desired signals within the data stream.

20 Claims, 7 Drawing Sheets

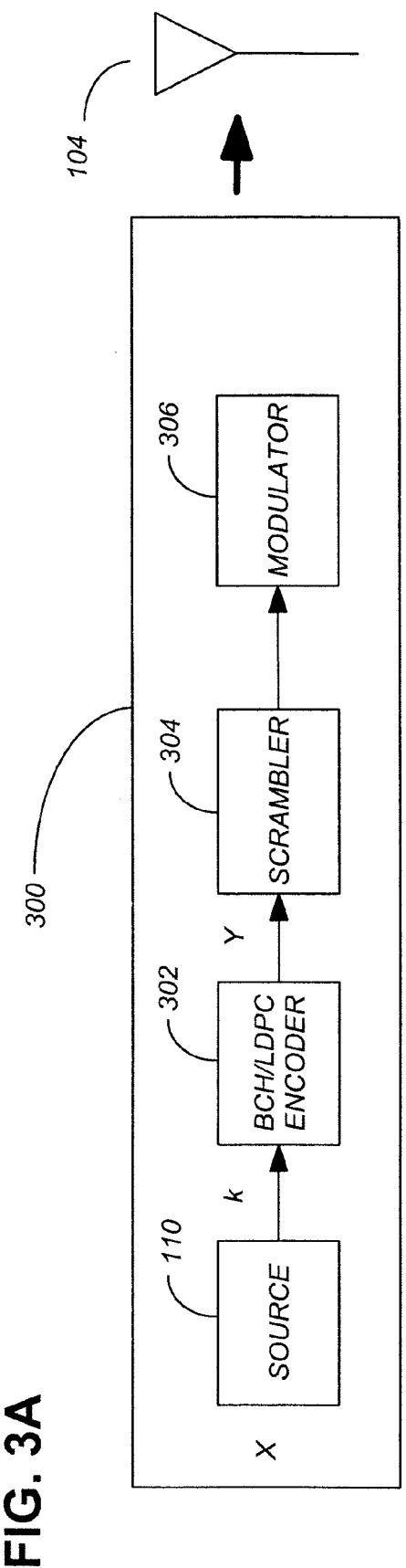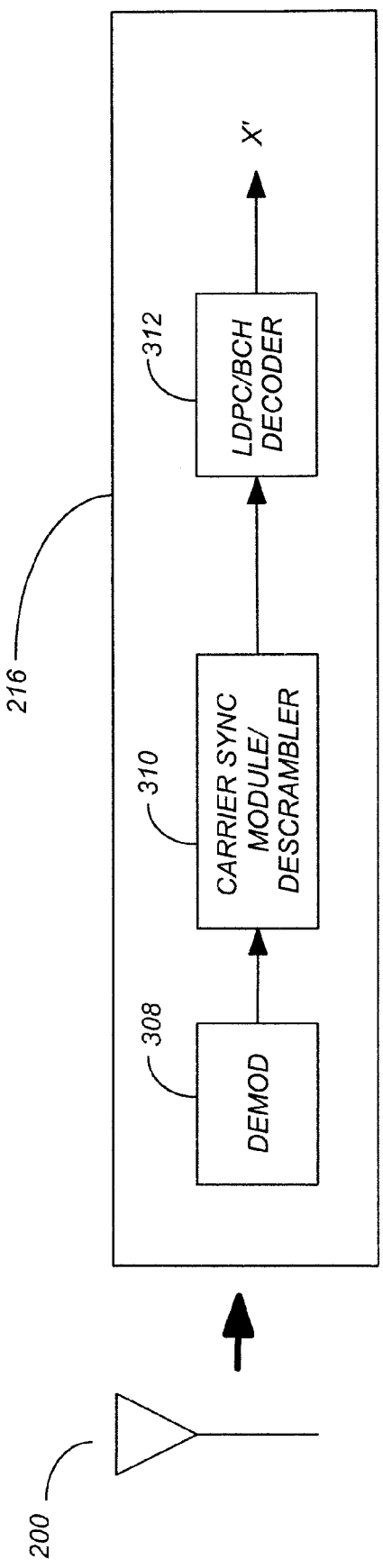
FIG. 3A
FIG. 3B

BLIND IDENTIFICATION OF ADVANCED MODULATION AND CODING MODES

CROSS-REFERENCE TO RELATED APPLICATIONS

This application claims the benefit under 35 U.S.C. § 119(e) of co-pending and commonly-assigned U.S. provisional patent application Ser. No. 60/771,394, filed Feb. 8, 2006, entitled "BLIND IDENTIFICATION OF ADVANCED MODULATION AND CODING MODES," by Joseph Santoru et al., which application is incorporated by reference herein.

BACKGROUND OF THE INVENTION

1. Field of the Invention

The present invention relates to communication systems, and more particularly to methods and apparatuses for minimizing signal interference.

2. Description of the Related Art

FIG. 1 illustrates a typical satellite television system of the related art.

FIG. 1 shows a communications system, specifically a television broadcasting system 100, which transmits and receives audio, video, and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including video content, audio content, audio and video related content (e.g., television viewer channels), or data content (e.g., computer data).

Television broadcasting system 100 includes transmission station 102, uplink dish 104, at least one satellite 106, and receiver stations 108A-108C (collectively referred to as receiver stations 108). Transmission station 102 includes a plurality of inputs 110 for receiving various signals, such as analog television signals, digital television signals, video tape signals, original programming signals and computer generated signals containing HTML content. Additionally, inputs 110 receive signals from digital video servers having hard discs or other digital storage media. Transmission station 102 also includes a plurality of timing inputs 112, which provide electronic schedule information about the timing and content of various television channels, such as that found in television schedules contained in newspapers and television guides. Transmission station 102 converts the data from timing inputs 112 into program guide data. Program guide data may also be manually entered at the site of transmission station 102. The program guide data consists of a plurality of "objects". The program guide data objects include data for constructing an electronic program guide that is ultimately displayed on a user's television monitor.

Transmission station 102 receives and processes the various input signals received on inputs 110 and timing inputs 112, converts the received signals into a standard form, combines the standard signals into a single output data stream 114, and continuously sends output data stream 114 to uplink dish 104. Output data stream 114 is a digital data stream that is typically compressed using MPEG-2 encoding, although other compression schemes, such as MPEG-4 or other schemes, may be used.

The digital data in output data stream 114 are divided into a plurality of packets, with each such packet marked with a Service Channel Identification (SCID) number. The SCIDs can be used by a receiver in receiver station 108 to identify the packets that correspond to each television channel. Error correction data is also included in output data stream 114.

Output data stream 114 is typically a multiplexed signal that is modulated by transmission station 102 using standard frequency and polarization modulation techniques. Output data stream 114 preferably includes a plurality of frequency bands, typically sixteen frequency bands, with each frequency band being either left polarized or right polarized. Alternatively, vertical and horizontal polarizations may be used.

Uplink dish 104 continuously receives output data stream 114 from transmission station 102, amplifies the received signal and transmits signal 116 to at least one satellite 106. Although a single uplink dish 104 and three satellites 106 are shown in FIG. 1, multiple uplink dishes 104 and a larger number of satellites 106 are preferably used to provide additional bandwidth, and to help ensure continuous delivery of signals 114 to receiver stations 108.

Satellites 106 revolve in geosynchronous orbit about the earth. Satellites 106 each include a plurality of transponders that receive signals 116 transmitted by uplink dish 104, amplify the received signals 116, frequency shift the received signals 116 to different frequency bands, and then transmit the amplified, frequency shifted signals 118 back to desired geographic areas on the Earth, where receiver stations 108 are located or will be located at some time in the future. Receiver stations 108 then receive and process the signals 118 transmitted by satellites 106.

Each satellite 106 typically broadcasts signals 118 in thirty-two (32) different frequencies, which are licensed to various users for broadcasting of programming, which can be audio, video, or data signals, or any combination. These signals are typically located in the Ku-band of frequencies, i.e., 11-18 GHz, but can be broadcast in the Ka-band of frequencies, i.e., 18-40 GHz, more typically in the 20-30 GHz range, or other frequency bands.

FIG. 2 is a block diagram of one of receiver stations 108, which receives and decodes audio, video and data signals. Typically, receiver station 108 is a "set top box," also known as an Integrated Receiver Decoder (IRD), which is usually resident in a home or multi-dwelling unit, for reception of satellite broadcasted television signals 118. Receiver station 108 may also be a Personal Video Recorder (PVR) which can record signals for playback at a later date.

Receiver dish 200 can be an Outdoor Unit (ODU), which is usually a smaller dish antenna mounted on a home or multi-dwelling unit. However, receiver dish 200 can also be a larger ground-mounted antenna dish if desired.

Receiver dish 200 typically uses a reflector dish and feedhorn assembly to receive and direct downlink signals 118 to receiver station 108 via a wire or coaxial cable. Each receiver station has a dedicated cable that allows receiver dish 200, via a multiswitch, to selectively direct downlink signals 118 to receiver station 108, and allows receiver station 108 to determine which of the signals 118 is desired.

Receiver station 108 typically includes receiver dish 200, alternate content source 202, receiver 204, monitor 206, recording device 208, remote control 210 and access card 212. Receiver 204 includes tuner 214/demodulator/Forward Error Correction (FEC) decoder 216, digital-to-analog (D/A) converter 218, CPU 220, clock 222, memory 224, logic circuit 226, interface 228, infrared (IR) receiver 230 and access card interface 232. Receiver dish 200 receives signals 118 sent by satellites 106, amplifies the signals 118 and passes the signals 118 on to tuner 214. Tuner 214 and demodulator/FEC decoder 216 operate under control of CPU 220.

The CPU 220 operates under control of an operating system stored in the memory 224 or within an auxiliary memory within the CPU 220. The functions performed by CPU 220 are controlled by one or more control programs or applications stored in memory 224. Operating system and applications are comprised of instructions which, when read and executed by the CPU 220, cause the receiver 204 to perform the functions and steps necessary to implement and/or use the present invention, typically, by accessing and manipulating data stored in the memory 224. Instructions implementing such applications are tangibly embodied in a computer-readable medium, such as the memory 224 or the access card 212. The CPU 220 may also communicate with other devices through interface 228 or the receiver dish 200 to accept commands or instructions to be stored in the memory 224, thereby making a computer program product or article of manufacture according to the invention. As such, the terms "article of manufacture," "program storage device" and "computer program product" as used herein are intended to encompass any application accessible by the CPU 220 from any computer readable device or media.

Memory 224 and access card 212 store a variety of parameters for receiver 204, such as a list of channels receiver 204 is authorized to process and generate displays for; the zip code and area code for the area in which receiver 204 is used; the model name or number of receiver 204; a serial number of receiver 204; a serial number of access card 212; the name, address and phone number of the owner of receiver 204; and the name of the manufacturer of receiver 204.

Access card 212 is removable from receiver 204 (as shown in FIG. 2). When inserted into receiver 204, access card 212 is coupled to access card interface 232, which communicates via interface 228 to a customer service center (not pictured). Access card 212 receives access authorization information from the customer service center based on a user's particular account information. In addition, access card 212 and the customer service center communicate regarding billing and ordering of services.

Clock 222 provides the current local time to CPU 220. Interface 228 is preferably coupled to a telephone jack 234 at the site of receiver station 108. Interface 228 allows receiver 204 to communicate with transmission station 102 as shown in FIG. 1 via telephone jack 234. Interface 228 may also be used to transfer data to and from a network, such as the Internet.

The signals sent from receiver dish 200 to tuner 214 are a plurality of modulated Radio Frequency (RF) signals. The desired RF signal is then downconverted to baseband by the tuner 214, which also generates in-phase and quadrature-phase (I and Q) signals. These two signals are then passed to the demodulator/FEC Application Specific Integrated Circuit (ASIC) 216. The demodulator 216 ASIC then demodulates the I and Q signals, and the FEC decoder correctly identifies each transmitted symbol. The received symbols for Quaternary Phase Shift Keying (QPSK) or 8PSK signals carry two or three data bits, respectively. The corrected symbols are translated into data bits, which in turn are assembled in to payload data bytes, and ultimately into data packets. The data packets may carry 130 data bytes or 188 bytes (187 data bytes and 1 sync byte).

In addition to the digital satellite signals received by receiver dish 200, other sources of television content are also preferably used. For example, alternate content source 202 provides additional television content to monitor 206. Alternate content source 202 is coupled to tuner 214. Alternate content source 202 can be an antenna for receiving off the air signals National Television Standards Committee (NTSC) signals, a cable for receiving American Television Standards Committee (ATSC) signals, or other content source. Although only one alternate content source 202 is shown, multiple sources can be used.

Initially, as data enters receiver 204, CPU 220 looks for initialization data which is referred to commonly in the industry as a boot object. A boot object identifies the SCIDs where all other program guide objects can be found. Boot objects are always transmitted with the same SCID, so CPU 220 knows that it must look for packets marked with that SCID. The information from the boot object is used by CPU 220 to identify packets of program guide data and route them to memory 224.

Remote control 210 emits Infrared (IR) signals 236 that are received by infrared receiver 230 in receiver 204. Other types of data entry devices may alternatively be used, by way of example and not limitation, such as an ultra-high frequency (UHF) remote control, a keypad on receiver 204, a remote keyboard and a remote mouse. When a user requests the display of a program guide by pressing the "guide" button on remote control 210, a guide request signal is received by IR receiver 230 and transmitted to logic circuit 226. Logic circuit 226 informs CPU 220 of the guide request. In response to the guide request, CPU 220 causes memory 224 to transfer a program guide digital image to D/A converter 218. D/A converter 218 converts the program guide digital image into a standard analog television signal, which is then transmitted to monitor 206. Monitor 206 then displays the TV video and audio signals. Monitor 206 may alternatively be a digital television, in which case no digital to analog conversion in receiver 204 is necessary.

Users interact with the electronic program guide using remote control 210. Examples of user interactions include selecting a particular channel or requesting additional guide information. When a user selects a channel using remote control 210, IR receiver 230 relays the user's selection to logic circuit 226, which then passes the selection on to memory 224 where it is accessed by CPU 220. CPU 220 performs an MPEG2/MPEG4 decoding step on received audio, video, and other packets from FEC decoder 216 and outputs the audio and video signals for the selected channel to D/A converter 218. D/A converter 218 converts the digital signals to analog signals, and outputs the analog signals to monitor 206.

Such communications systems 100, here by example which is shown a television broadcast system 100, have embraced the demand for high quality transmissions made possible by digital technology. As the packets and other data are transmitted from uplink dish 104 to receiver 108, the symbols and bits in packets intended for other receiver stations 108 are typically transmitted down from satellite 106 to receiver 108 on the same frequency, because the transmit frequency is controlled by the limitations of satellites 106, and the transmit frequencies that are available are controlled by government permission for transmission at specific frequencies within the frequency spectrum.

Further, the data frames are coded in such a manner that they can interfere with each other, and receiver 108 cannot decode and present the wanted signals on monitor 206. Such interference is called "co-channel" interference, where one channel of data interferes with the reception and demodulation of another channel of data. In practical applications, the co-channel interference may also stem from transmission of other system operators, a satellite 106 operating in an adjacent orbital slot, or other spot transmission beams in a spot beam satellite broadcasting system 100.

As communications systems 100 transmits more data, i.e., more channels of programming on a satellite broadcast system that are viewable on monitor 206, the probability of interference between data transmission will increase, and, as such, the quality of the signal reception may be negatively impacted.

To make optimal use of the available spectrum and to deliver a high number of different channels of programming with minimum interference, RF transmissions are scrambled with different codes. However, without knowledge of the codes, the receivers 108 cannot determine which of the signals 118 to decode, and, therefore, the receivers 108 would not be able to process the signals 118 properly.

It can be seen, then, that there is a need in the art to be able to properly identify the scrambling codes without prior knowledge for decoding and display in a broadcasting system.

SUMMARY OF THE INVENTION

To minimize the limitations in the prior art, and to minimize other limitations that will become apparent upon reading and understanding the present specification, the present invention discloses methods and apparatuses for acquiring and demodulating a data stream transmitted in a communication system. A method in accordance with the present invention comprises finding a boundary of a physical layer frame (PLFrame) in the data stream, finding a first 26 bits of a Unique Word (UW) associated with the data stream, finding a scrambling code utilizing the UW, and using a decoding procedure to determine a modulation type and code rate used for desired signals within the data stream.

Such a method further optionally includes the data stream being a downlink signal from a satellite, the scrambling code further comprising a Gold code used to scramble a payload portion of the data stream, finding the boundary of the PLFrame further comprises finding a coarse boundary of the PLFrame, finding the boundary of the PLFrame further comprises finding a Start Of Frame (SOF) of the PLFrame, finding the SOF comprises normalizing a conjugate product of a last symbol of a PLHeader and a first symbol of the PLHeader, finding the first 26 bits of the UW comprises normalizing the first 26 symbols of the data stream after the SOF such that a first symbol has a known phase, and finding a scrambling code comprises looking up the scrambling code associated with the UW.

An apparatus in accordance with the present invention acquires and demodulates a data stream transmitted in a communication system, and comprises a demodulator for finding a boundary of a physical layer frame in the data stream and for finding a first 26 bits of a unique word associated with the data stream, a descrambler, coupled to the demodulator, for finding a scrambling code utilizing the unique word, and a decoder, coupled to the descrambler, for determining a modulation type and code rate used for desired signals within the data stream and for decoding the data stream.

Such an apparatus further optionally includes the data stream being a downlink signal from a satellite, the scrambling code further comprising a Gold code used to scramble a payload portion of the data stream, finding the boundary of the physical layer frame further comprising finding a coarse boundary of the physical layer frame, finding the boundary of the physical layer frame further comprising finding a start-of-frame of the physical layer frame, finding the start-of-frame comprising normalizing a conjugate product of a last symbol of a physical layer header and a first symbol of the physical layer header, finding the first 26 bits of the unique word comprises normalizing the first 26 symbols of the data stream after the start-of-frame such that a first symbol has a known phase, and finding a scrambling code comprises looking up the scrambling code associated with the unique word.

Another system embodiment in accordance with the present invention transmits and receives a data stream, and comprises a transmitter, the transmitter further comprising an encoder, the encoder accepting the data stream and generating an encoded version of the data stream including a physical layer header and a payload portion, a scrambler, coupled to the encoder, for accepting the encoded version of the data stream and creating a scrambled version of the data stream, and a modulator, coupled to the encoder, for modulating the scrambled version of the data stream onto a carrier; and a receiver, the receiver further comprising a demodulator for finding a boundary of a physical layer frame in the scrambled version of the data stream and for finding a first 26 bits of a unique word associated with the scrambled version of the data stream, a descrambler, coupled to the demodulator, for applying a scrambling code to the scrambled version of the data stream utilizing the unique word to re-create the encoded version of the data stream, and a decoder, coupled to the descrambler, for decoding the encoded version of the data stream using a modulation type and code rate that extracts desired signals within the data stream.

Such a system further optionally includes scrambling the encoded version of the data stream which scrambles only the payload portion of the encoded version of the data stream, the data stream being a downlink signal from a satellite, and the scrambling code further comprising a Gold code used to scramble a payload portion of the data stream.

Still other aspects, features, and advantages of the present invention are inherent in the systems and methods claimed and disclosed or will be apparent from the following detailed description and attached drawings. The detailed description and attached drawings merely illustrate particular embodiments and implementations of the present invention, however, the present invention is also capable of other and different embodiments, and its several details can be modified in various respects, all without departing from the spirit and scope of the present invention. Accordingly, the drawings and description are to be regarded as illustrative in nature, and not as a restriction on the present invention.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-3B are diagrams of an exemplary transmitter and demodulator employed in the digital transmission facility of the system of FIGS. 1-2;

DESCRIPTION OF THE PREFERRED EMBODIMENT

Figure 1:
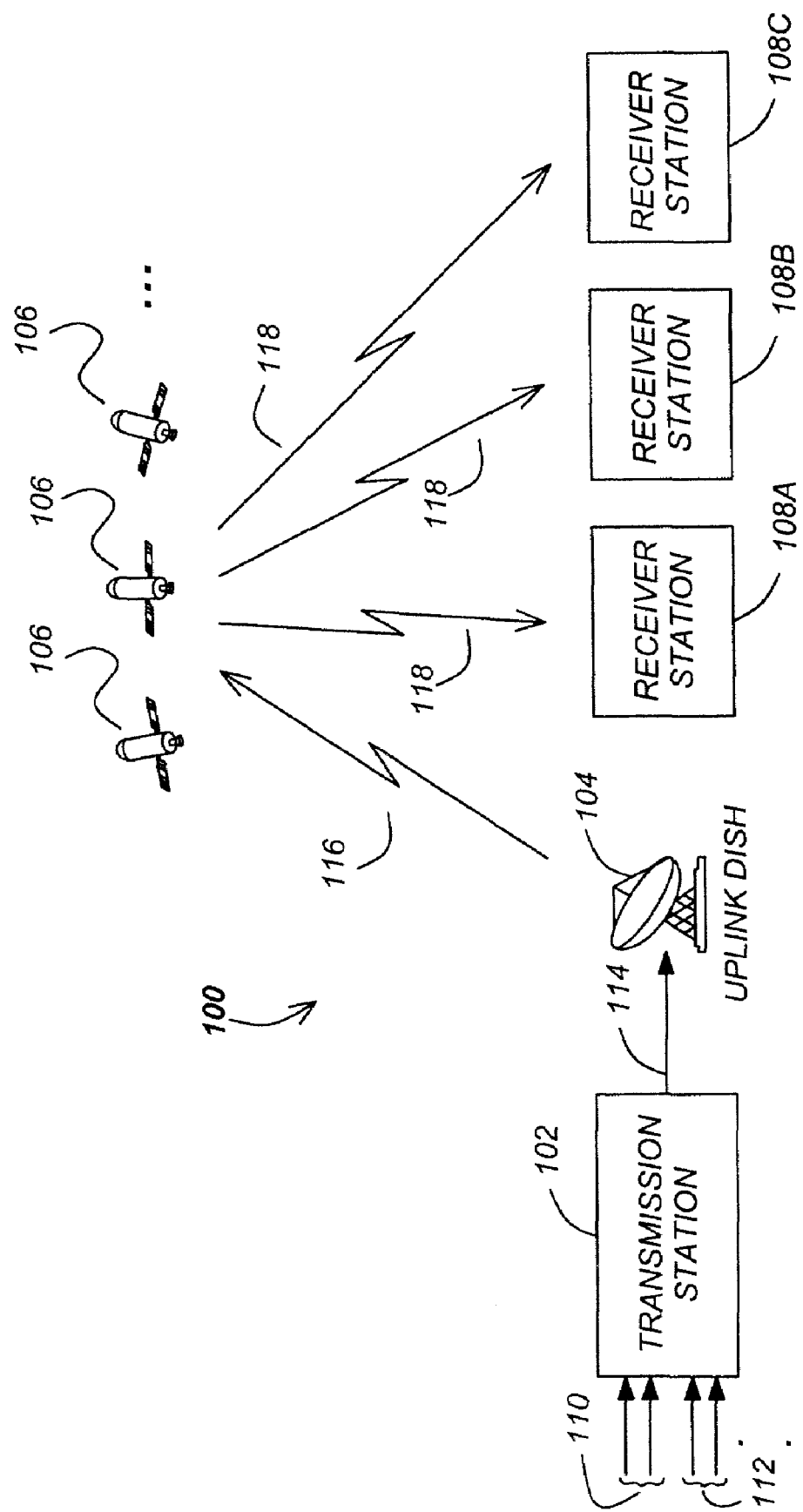
FIG. 1 illustrates a typical satellite based broadcast systems of the related art.

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

In the present invention, the digital data transmitted from transmission station 102 via signal 114, satellites 106, and signal 118. The digital data contains three main components: a header portion of a data frame, called the physical layer header or PL header; payload data; and optionally, additional inserted symbols, called pilot symbols, which are used by the receiver 108 to mitigate the deleterious effects of degradation in the receiver station 108, primarily phase noise. By using the PL header, the demodulator/FEC-decoder 216 can quickly acquire the correct phase and frequency at the beginning of every data frame. For many 8PSK and QPSK transmission modes, pilot symbols are also needed to track the signals in phase noise more accurately. However, in certain instances, when the PL headers for a desired signal and an interfering co-frequency signal align in time, the interference is so great that the demodulator/FEC-decoder 216 cannot determine with necessary accuracy the phase of the carrier frequency associated with the wanted signal. This means that as the demodulator 216 tries to maintain a phase lock on the desired signal, the undesired signal presents the same header symbols or pilot symbols, and the demodulator 216 can be confused by the presence of the undesired signal, and therefore unable to track the phase of the desired signal. Such confusion in the demodulator 216 is known in the art as having the demodulator 216 being "pulled off" of the desired signal. If the demodulator 216 is pulled toward 45 degrees from the optimal constellation point for a QPSK transmission, the demodulator will not identify the symbols correctly. This will introduce errors, and if not rectified quickly, the data errors will be identified as a loss of lock. This, in turn, will lead the microprocessor 220 to command the demodulator 216 to reacquire the signal, which leads to loss of data until the desired signal is reacquired. Such a loss of data would present incorrect data on monitor 206, and possibly a service interruption on monitor 206 as viewed by a viewer. Rather than viewing a desired television channel with motion and dialog on a given monitor 206, the co-channel interference would cause the viewer to see the monitor fade to a dark screen, or see a garbled picture, or hear garbled audio.

The present invention relates to the issue of initial acquisition of the downlink signal 118. If the demodulator 216 does not have the proper information to decode the downlink signals 118, which are encoded using modulation and forward-error-correction (FEC) system based on the new DVBS2 specification using the Low-Density-Parity-Check (LDPC) and BCH codes, the demodulator 216 will not be able to demodulate and decode the signals 118.

Although prior applications concern themselves with co-frequency interference, which is present at levels even as low as −14 dBc, causing the FEC decoder may suffer intermittent loss of data under clear sky conditions. To address this issue, prior patent applications refer to a scrambling technique which ensures that any two DVBS2 transmissions are sufficiently different. The data frame consists of three parts—a physical layer header (PLHeader), the payload section, and Pilot symbols. These prior applications describe a scrambling process that uses one scrambling code for the PLHeader (called the unique word) and another code for the payload and pilots sections (Gold code). Currently, there are approximately 1000 pairs of unique words and Gold codes available, with one pair of codes used with each downlink transmission 118.

However, none of the prior inventions concern themselves with improper acquisition of the signals 118. The current demodulator/FEC 216 ASICs in IRDs 108 must have certain information to decode the DVBS2 transmissions, including the unique word and Gold codes. If, for any reason, the unique word or Gold code is not available or incorrect, the signal 118 cannot be decoded.

The present invention provides a method, apparatus, and article of manufacture for nearly blind acquisition of scrambled DVBS2 transmissions. The present invention provides a way to determine the unique word and Gold code using only (1) the prior knowledge of the possible unique words and Gold codes that may be used, (2) the center frequency and (3) the symbol rate of the transmission. Computer simulations indicate that the procedure described in this disclosure can be used to identify the unique word and Gold code in a new demodulator/FEC-decoding ASIC in less than one second, as compared to the current situation where the signal will not be decoded.

Without blind acquisition of the scrambling codes, an IRD receiver must have the correct scrambling code or the signal cannot be decoded. The present invention provides a computationally efficient method to avoid acquisition failures due to use of incorrect or missing scrambling codes.

System Overview

In broadcast applications, continuous mode receivers 108 are widely used. Scrambling and error-correction codes that perform well in low signal-to-noise (SNR) environments are at odds with these receivers 108 with respect to synchronization (e.g., carrier phase and carrier frequency). Physical layer header and/or pilot symbols can be used for such synchronization. Accordingly, an important consideration with respect to system performance is that of co-channel interference on physical layer header and/or pilot symbols. Because physical layer header and/or pilots are used for acquiring and/or tracking carrier phase and carrier frequency, such interference can degrade receiver performance.

Many digital broadcast systems 100 require use of additional training symbols beyond that of the normal overhead bits in a frame structure for their synchronization processes. The increase in overhead is particularly required when the Signal-to-Noise (SNR) is low relative to the required levels and in combination or singly, the phase noise is high; such an environment is typical when high performance codes are used in conjunction with high order modulation. Traditionally, continuous mode receivers utilize a feedback control loop to acquire and track carrier frequency and phase. Such approaches that are purely based on feedback control loops are prone to strong Radio Frequency (RF) phase noise and thermal noise, causing high cycle slip rates and an error floor on the overall receiver performance. Thus these approaches are burdened by increased overhead in terms of training symbols for certain performance target, in addition to limited acquisition range and long acquisition time. Further, these conventional synchronization techniques are dependent on the particular modulation scheme, thereby hindering flexibility in use of modulation schemes.

In system 100, the receivers 108 typically achieve carrier synchronization by examining the preambles, headers, and/or unique scrambling codes or unique words (UW) that are embedded in broadcast data frame structures (shown in FIG. 4A), thereby reducing the use of additional overhead specifically designated for training purposes.

In such a discrete communications system 100, the transmission facility 102 produces a discrete set of possible messages representing media content (e.g., audio, video, textual information, data, etc.); each of the possible messages has a corresponding signal waveform. These signal waveforms are attenuated, or otherwise altered, by communications channel 116 and 118. To combat the noise in the broadcast channel 116 and 118, the transmission facility 102 utilizes forward-error-correction codes, such as Low Density Parity Check (LDPC) codes, or a concatenation of different FEC codes.

The LDPC or other FEC code or codes that are generated by the transmission facility 102 facilitate high speed implementation without incurring any performance loss. These structured LDPC codes output from the transmission facility 102 avoid assignment of a small number of check nodes to the bit nodes already vulnerable to channel errors by virtue of the modulation scheme (e.g., 8PSK). Such LDPC codes have a parallelizable decoding process (unlike turbo codes), which advantageously involves simple operations such as addition, comparison and table look-up. Moreover, carefully designed LDPC codes do not exhibit a shallow error floor, e.g., there is no decrease in errors even though the signal-to-noise ratio increases. If an error floor were to exist, it would be possible to use another code, such as a Bose/Chaudhuri/Hocquenghem (BCH) code or other codes, to significantly suppress such error floor.

According to one embodiment of the present invention, the transmission facility 102 generates, using a relatively simple encoding technique as explained below in FIG. 2, scrambling codes that are generated based on their ability to combat co-channel interference.

Transmitter Functions

FIG. 3A is a diagram of an exemplary transmitter employed in the digital transmission facility of the system 100 of FIG. 1. A transmitter 300 in transmission facility 102 is equipped with an LDPC/BCH encoder 302 that accepts input from an information source 110 and outputs coded stream of higher redundancy suitable for error correction processing at the receiver 108. The information source 110 generates signal k from input X. LDPC codes are specified with parity check matrices. Encoding LDPC codes requires, in general, specifying the generator matrices. BCH codes are included to reduce the error floor of system 100, which improves error correction performance.

Encoder 302 generates signal Y to a scrambler 304 and a modulator 306, using a simple encoding technique that makes use of only the parity check matrix by imposing structure onto the parity check matrix. Specifically, a restriction is placed on the parity check matrix by constraining certain portion of the matrix to be triangular. Such a restriction results in a high computation efficiency with negligible performance loss, and therefore, constitutes an attractive trade-off.

Scrambler 304 scrambles the FEC encoded symbols in accordance with the present invention to minimize co-channel interference, as will be more fully described below.

Modulator 306 maps the scrambled messages from scrambler 304 output to signal waveforms that are transmitted to a transmit antenna 104, which emits these waveforms over the communication channel 116. The transmissions from the transmit antenna 104 propagate to a demodulator, as discussed below. In the case of a satellite communication system, the transmitted signals from the antenna 104 are relayed via a satellite to receiver 108 as shown in FIG. 1.

Demodulator

Figure 2:
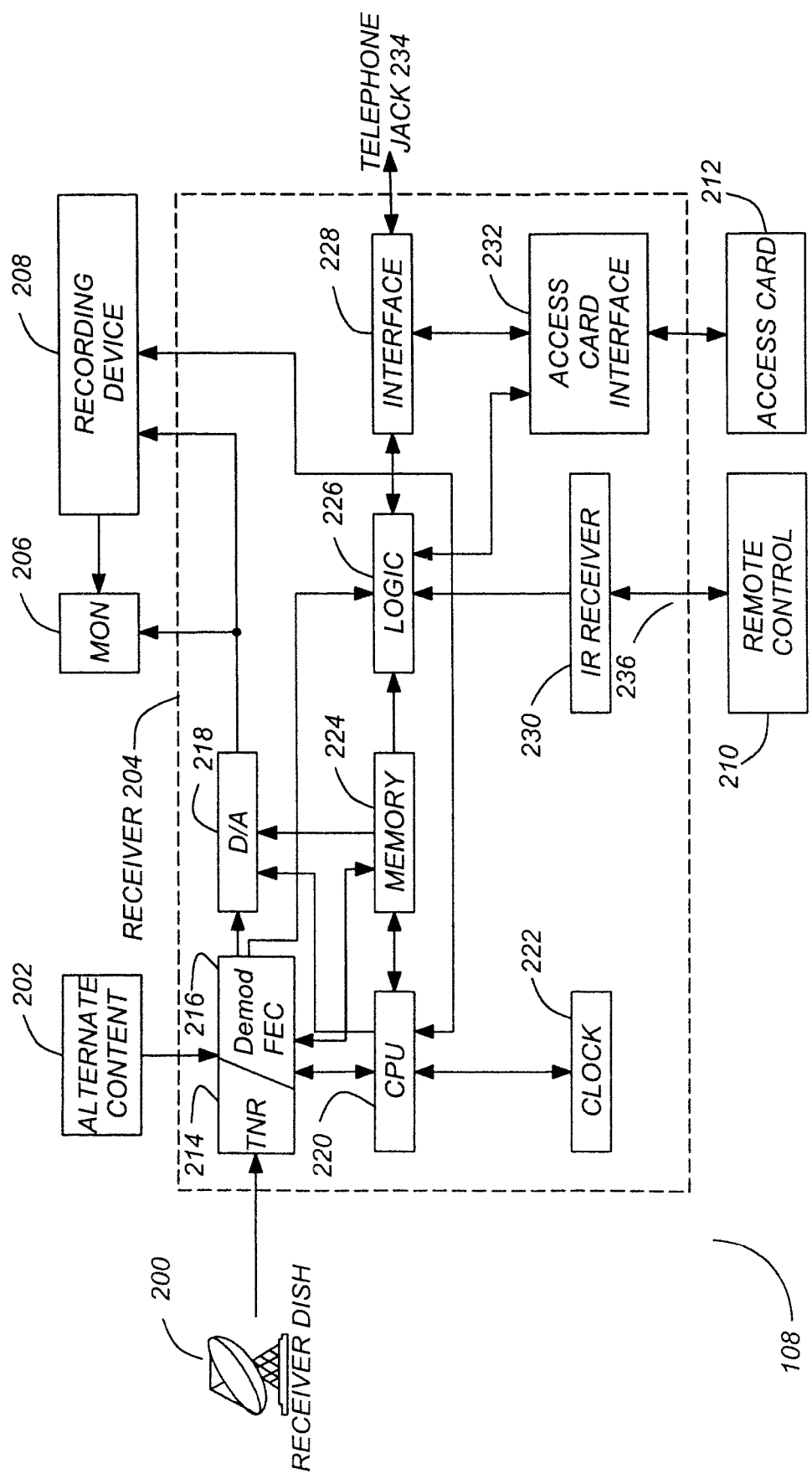
FIG. 2 is a block diagram of a receiver station which receives and decodes audio, video and data signals.

FIG. 3B is a diagram of an exemplary demodulator/FEC decoder 216 in the system of FIG. 2. The demodulator/FEC decoder 216 comprises a demodulator 308, a carrier synchronization module/descrambler 310, and a LDPC/BCH decoder 312 and supports reception of signals from the transmitter 300 via antenna 200. According to one embodiment of the present invention, the demodulator 308 provides filtering and symbol timing synchronization of the LDPC encoded signals received from antenna 200, and carrier synchronization module 310 provides frame synchronization, frequency and phase acquisition and tracking and descrambling of the signals output from the demodulator 308. After demodulation, the signals are forwarded to an LDPC decoder 312, which attempts to reconstruct the original source messages by generating messages, X'.

With respect to the receiving side, if both the desired and interfering carriers use the same modulation and coding configuration (or mode), when the frame header (shown in FIG. 4A) are aligned in time while their relative frequency offset are small, the interference can cause significant errors in phase estimation for the demodulator. As a result, the demodulator can put out errors periodically, when the signal and interference frames line up in time. This condition occurs when frequency and symbol clock of the signals in question are sufficiently close, although they may be drifting with respect to each other.

Frame Structure

Figure 4A:
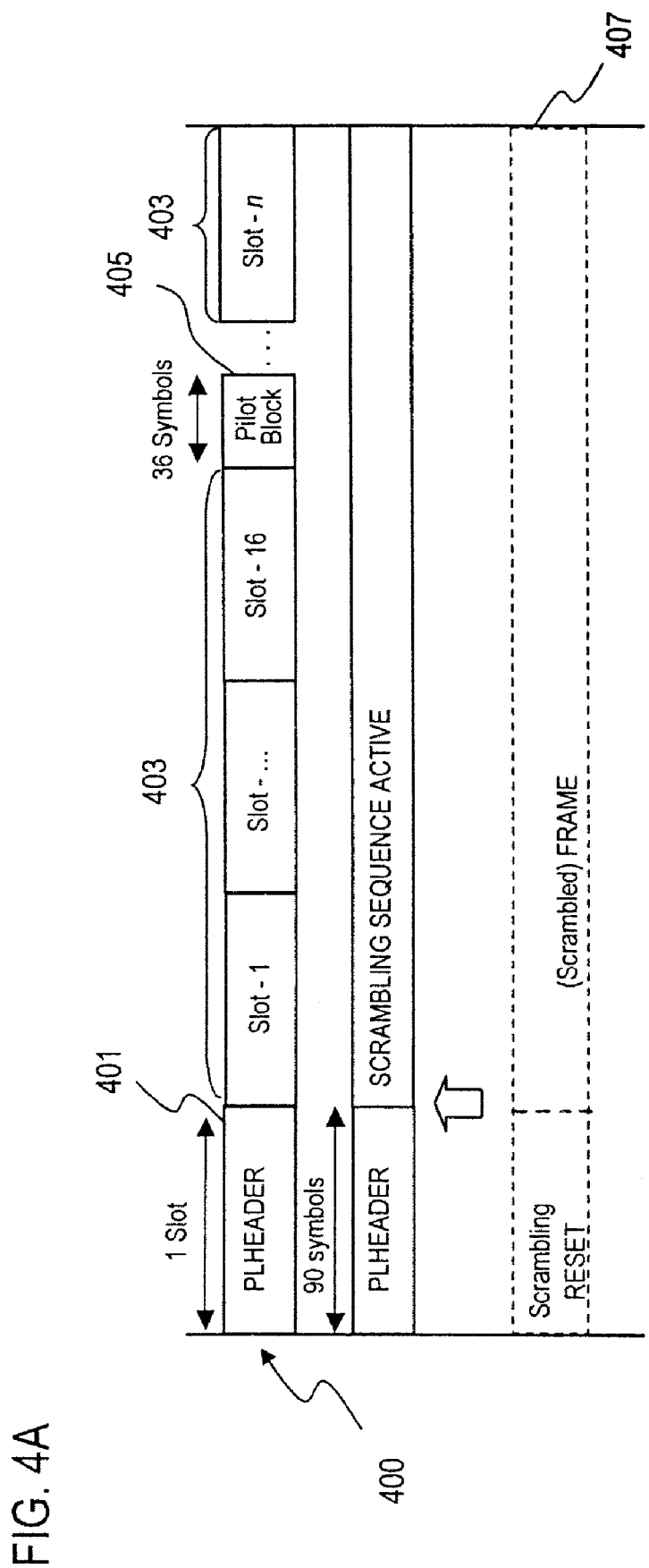
FIGS. 4A and 4B are diagrams of a frame structure used in the system of FIG. 3, and of logic for scrambling the frame headers with different Unique Words (UWs), in accordance with an embodiment of the present invention.

FIG. 4A is a diagram of an exemplary frame structure used in the system of the present invention. By way of example, an LDPC coded frame 400, which can support, for example, satellite broadcasting and interactive services, is shown. The frame 400 includes a Physical Layer Header (denoted "PL Header") 401 and occupies one slot, as well as other slots 403 for data or other payload. In addition, the frame 400, according to one embodiment of the present invention, utilizes a pilot block 405 after every 16 slots to aid synchronization of carrier phase and frequency. It is noted that the pilot blocks 405 are optional. Although shown after 16 slots 403, the pilot block (or pilot sequence) 405, which can represent a scrambled block, can be inserted anywhere along the frame 400.

In an exemplary embodiment, the pilot insertion process inserts pilot blocks every 1440 symbols. Under this scenario, the pilot block includes 36 pilot symbols. For instance, in the physical layer frame 400, the first pilot block is thus inserted 1440 payload symbols after the start of the PL Header 401, the second pilot block is inserted 2880 payload symbols after, etc. If the pilot block position coincides with the beginning of the next PL Header 401, then the pilot block 405 is not inserted.

The carrier synchronization module 310 (FIG. 3), according to an embodiment of the present invention, utilizes the PL Header 401 and/or pilot block 405 for carrier frequency and phase synchronization. The PL Header 401 and/or pilot block 405 may be used for carrier synchronization, i.e., for assisting with the operation of frequency acquisition and tracking, and phase tracking loop. As such, the PL Header 401 and pilot block 405 are considered "training" or "pilot" symbols, and constitute, individually or collectively, a training block.

Each PL header 401 typically comprises a Start Of Frame (SOF) section comprising 26 symbols, and a Physical Layer Signaling Code field (PLS code) comprising 64 symbols.

Typically, the SOF section is identical for all PL headers 401 for all of the signals being transmitted without further scrambling.

For QPSK, 8PSK, and other modulations, the pilot sequence 405 is a 36-symbol long segment (with each symbol being $(1+j)/\sqrt{2}$). In the frame 400, the pilot sequence 405 can be inserted after 1440 symbols of data. Under this scenario, the PL Header 401 can have 64 possible formats depending on the modulation, coding and pilot configuration.

When the PL headers 401 of the interfering carrier and the desired carrier (i.e., co-channels) are aligned in time, the coherent contribution from the interfering PL Header 401 can introduce significant phase error, causing unacceptable degradation in performance. Likewise, if both co-channels use pilot symbols (with both using the same Gold code sequence for the pilot blocks 405), the pilot blocks 405 will be scrambled exactly the same way such that the coherent contribution of the pilot block in the interfering carrier (or co-channel) is still problematic.

To mitigate the effect of co-channel interference, the frame 400 is scrambled, in pilot mode. In general, in this mode, the non-header portion 407 is scrambled with a Gold code sequence unique to the transmitter. However, in a broadcast mode, the entire frame 400, including the pilot block 405, is scrambled using a common code; e.g., all the receivers 108 are supplied with the same Gold sequence.

Applying Different Scrambling Codes to the PL Header

Figure 4B:
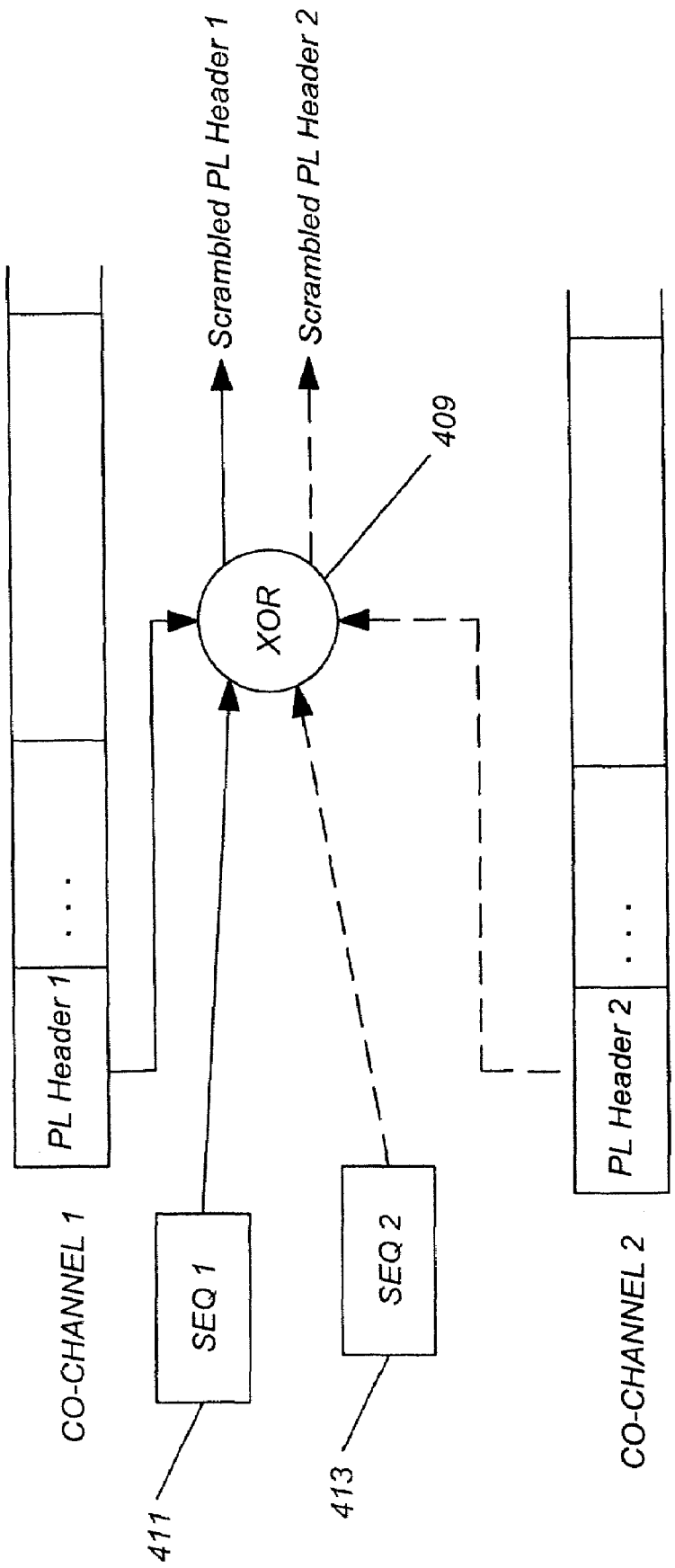

As seen in FIG. 4B, to reduce the impact of co-channel interference, several different Unique Word (UW) patterns of the same length as the PL header 401 can be utilized for the respective co-channels to scramble the PL headers 401. For example, an eXclusive-OR (via an XOR logic 409) of the different UW patterns 411, 413 with the PL HEADER 401 can be performed for the desired and interfering carriers (i.e., co-channels). Under this approach, power associated with the PL Header 401 of the interfering carrier no longer adds coherently to the PL Header 401 of the desired carrier.

Although the frame 400 is described with respect to a structure that supports satellite broadcasting and interactive services (and compliant with the Digital Video Broadcast (DVB)—S2 standard), it is recognized that the carrier synchronization techniques of the present invention can be applied to other frame structures.

Further, individual PL headers 401 can be scrambled prior to attaching the PL header 401 to the frame 400, and individual PL headers 401 can be scrambled without other PL headers 401 being scrambled. The invention envisions selecting scrambling codes (or seeds to generate the scrambling codes), or, alternatively, selecting no scrambling code, based on the expected co-channel interference between two data frames 400. The PL headers can be again scrambled as part of the data frame 400 scrambling as shown in FIG. 5, or otherwise encrypted using an encryption schema.

The codes 411 and 413 that are used to scramble the PL header 401 can be Gold codes as described herein, other seeded codes, or other coding schemes, without departing from the scope of the present invention. Such codes, or seeds for such codes, can be selected from a limited number of codes or seeds, and such codes or seeds can be sent to receiver 108 for use in descrambling the data frames 400 to demodulate and descramble the frames 400. The limited number of codes or seeds can be selected based on a number of factors, including the number of satellites 106, or the number of expected co-channel interferences in communication system 100.

Co-Channel Scrambling

Figure 5:
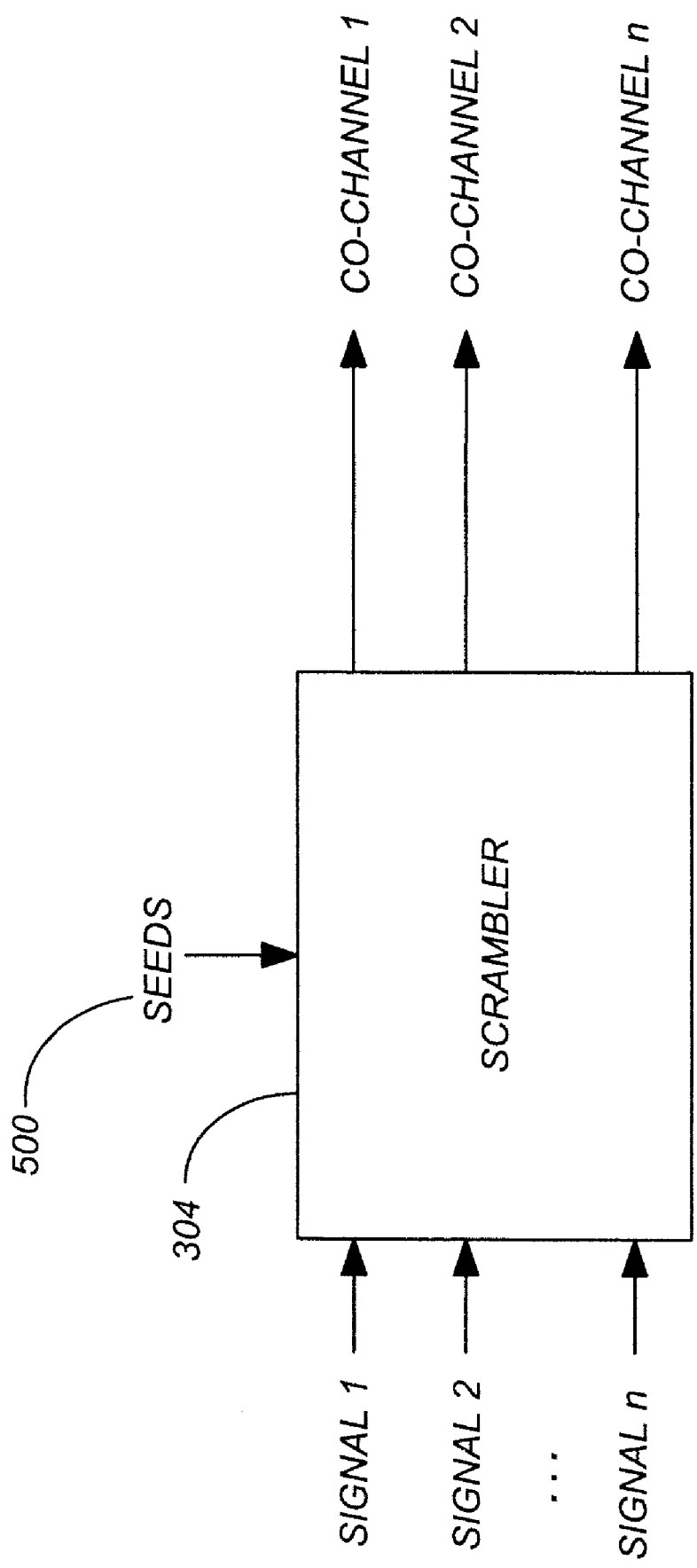
FIG. 5 is a diagram of a scrambler for isolating co-channel interference according to various embodiments of the present invention.

FIG. 5 is a diagram of a sequence scrambler for isolating co-channel interference, according to an embodiment of the present invention. A scrambling code is a complex sequence that can be constructed from a Gold code, according to one embodiment of the present invention. That is, a scrambler 304 generates a scrambling sequence Rn(i). Table 1 defines how the scrambling sequence Rn(i) scrambles the frame using the scrambler 304, according to the scrambler sequence generator of FIG. 5. In particular, Table 1 shows the mapping of an input symbol to an output symbol based on the output of the scrambler 304.

TABLE 1

| Rn(i) | Input(i) | Output(i) |
|---|---|---|
| 0 | I + jQ | I + jQ |
| 1 | I + jQ | −Q + jI |
| 2 | I + jQ | −I − jQ |
| 3 | I + jQ | Q − jI |

Using different seeds for either of such two m-sequence generators can generate different Gold sequences. By using different seeds 500 for different services, the mutual interference can be reduced.

In a broadcast mode, the 90 symbol physical layer header 401 can remain constant for a particular physical channel. The Gold sequence is reset at the beginning of each frame, and thus, the scrambled pilots are periodical as well with a period equal to the frame length. Because the information carrying data in a frame varies and appears to be random, the co-channel interference is random and degrades the operating SNR. Without using this scheme, due to the nature of time-invariance of the original PL header 401 and the pilot block 405, the carrier and phase estimation will be skewed for a receiver depending on these pilots and physical layer header for such acquisition and tracking. This will degrade the performance beyond those of SNR degradation associated with random data.

The scrambler 304 utilizes different scrambling sequences (n in FIG. 5) to further isolate the co-channel interference. One scrambling sequence is provided for the PL header and one for the pilots. Different pilots are specified in terms of different seeds from the n value of the Gold sequences.

As such, the present invention contemplates separate scrambling of several combinations of PL headers 401, pilot blocks 405, and payload 403 for co-channel interference mitigation. Depending on the complexity of the system, the PL headers 401 and pilot blocks 405 (if present) for a given channel can be scrambled using a different code than the co-channel without scrambling the payload 403. In essence, all non-payload 403 symbols that are present in one channel 400 are scrambled using one code, and all non-payload 403 symbols in another channel 400 are scrambled using a different code.

Further, the PL headers 401 and pilot blocks 405 (if present) for two different channels can be scrambled using different scrambling codes, and the payloads 403 for those channels can be scrambled using other codes. For example, a first scrambling sequence can be applied to a first PL header 401, and a second scrambling sequence can be applied to a second PL header 401. The first payload 403 and pilot block 405 has a third scrambling sequence applied (typically a Gold code), and the second payload and pilot block 405 has a fourth scrambling sequence applied (also typically a Gold code).

It is also contemplated within the present invention that there can be systems that use mated pairs of codes for the PL header 401 and the payload 403 and pilot block 405. So, a given scrambling code used on a PL header 401 is always used with a scrambling code used to scramble the payload 403 and pilot block 405. These code pairs can be applied to any signal 400, and can be re-assigned from one signal 400 to another signal 400 as desired.

It is also contemplated within the scope of the present invention that each payload 403 and pilot block 405 signal within system 100 receives a unique scrambling code. Further, each PL header 401 can receive a unique scrambling code, which can be mated with scrambling codes for the payloads 403 and pilot block 405 if desired.

Although described as a single scrambling sequence for a given channel 400, the present invention also contemplates that scrambling sequences can be changed or rotated after a given number of frames have been transmitted. The scrambling sequences for the PL header 401, the payload 403 and pilot block 405, or both can be rotated on a random or periodic basis as desired without departing from the scope of the present invention.

Application of Codes in Specific Order/Combinations

As seen in FIGS. 4A-4B, the Gold sequence seeds 500 (which are used to scramble payload 403 and pilot block 405) and header scrambling codes 411, 413 (used to scramble PL header 401) are applied to each signal. However, a given seed 500 does not necessarily work very well with a given header 411 code. The best seeds 500 and PL header codes 411 combinations are selected and tests are performed to ensure that the selected seed 500/header code 411 combinations will not interfere with other combinations of seed 500/header code 411 pairs.

To ensure that these pairs (of seeds 500/header codes 411 to be applied to a given channel) operate properly with all other pairs in the system 100, each pair is checked against all other pairs for possible co-channel interference. If there are 1000 channels to be broadcast, then 1000 pairs of seed 500/header code 411 need to be generated and checked.

Seed Generation

Each of the seeds 500 is initially generated independently of the header codes 411. Each pair is sometimes referred to as an Advanced Modulation and Coding (AMC) scrambling code, and is given an AMC code number as an easy reference tool. For example, and not by way of limitation, AMC code 1 can be a combination of seed 500 (where the seed is "00") and a header code 411 (where the header code is code "01"). AMC code 2 would be a combination of a different seed 500 and a different header code 411. The transmitter 300 and demodulator 308 are then programmed with the AMC code numbers for each transponder of satellites 106, such that the demodulator 308 "knows" which AMC code to apply to a given signal for tuning and demodulation purposes.

Initially, the first seed (which results in a Gold scrambling sequence for each signal) is selected using a desired scheme, such as adopting the default seed from DVB-S2 broadcast standard. The second candidate seed 500 is selected from the remainder of the Gold sequence pool, calculating the cross-correlations of the candidate Gold sequence with respect to the first sequence as implemented in with a DVBS-2 transmission mode with pilot symbols. The candidate seed is kept only if all of its cross-correlations with the first seed are below a predetermined threshold for all pilot offsets, otherwise another candidate will be selected from the remaining seed pool for the second seed, and the process continues until the second seed is selected. A third candidate seed is then selected, and the cross correlations for the third transmission scrambled using the third candidate Gold code with each of the two prior transmissions are calculated. The third seed is selected only if its cross-correlations with both the first and second seeds are below the threshold for all pilot offsets, etc. The process continues until the required number of codes is identified. Thus all selected Gold sequences have cross-correlations with respect to each other below the predetermined threshold value. indicating that transmissions using these seeds will not be well correlated with each other and hence will introduce minimal deleterious interference with each other. The threshold value is selected as a worst-case scenario for co-channel interference given the channel separation possible in the components used to build system 100. A subset of these seeds 500 can be reserved for specific portions of the system 100, e.g., used for the Boot Strap Loader (BSL), or for other purposes. As the permutations of these seed 500 sequences are compared, the codes can then be ranked by performance, with the best seeds 500 being ranked higher than the worst seeds 500, and thus, a rank order of seeds 500 can be created.

Code Pair Blind Acquisition

Typically, the demodulator 216 has information about the combination of seed 500/code 411 that will be present on a given downlink signal 118, and the downlink signal 118 is properly demodulated, decoded, and displayed on monitor 206. However, there are times when the code knowledge present in receiver 108 does not match the code being used for signal 118, and, thus, the acquisition of signal 118 will not occur.

The present invention uses memory 224, and CPU 220, and, if necessary, clock 222, to determine whether or not signal 118 has been acquired, by storing information in memory 224 about all the code combinations that are used to encode signals 118, and sequentially going through the code combinations if acquisition does not occur normally or within a specified time period.

There are several basic factors that will be used in the following discussion.

The Physical Layer frame symbol length for DIRECTV Modes is 32490, 33282, 21690 or 22194.

Current scrambling codes can be uniquely identified by the first 26 bits of the unique word, even by the 25 differential bits of the first 26 UW bits: When comparing all 1000+16 available unique words, the minimum Hamming distance among 1016 differential bits of the first 26 bits of UW is 2.

Timing recovery can be done without AMC mode information, and the frequency offset can be reduced to 1 MHz by some well known algorithms.

Process Flow

Figure 6:
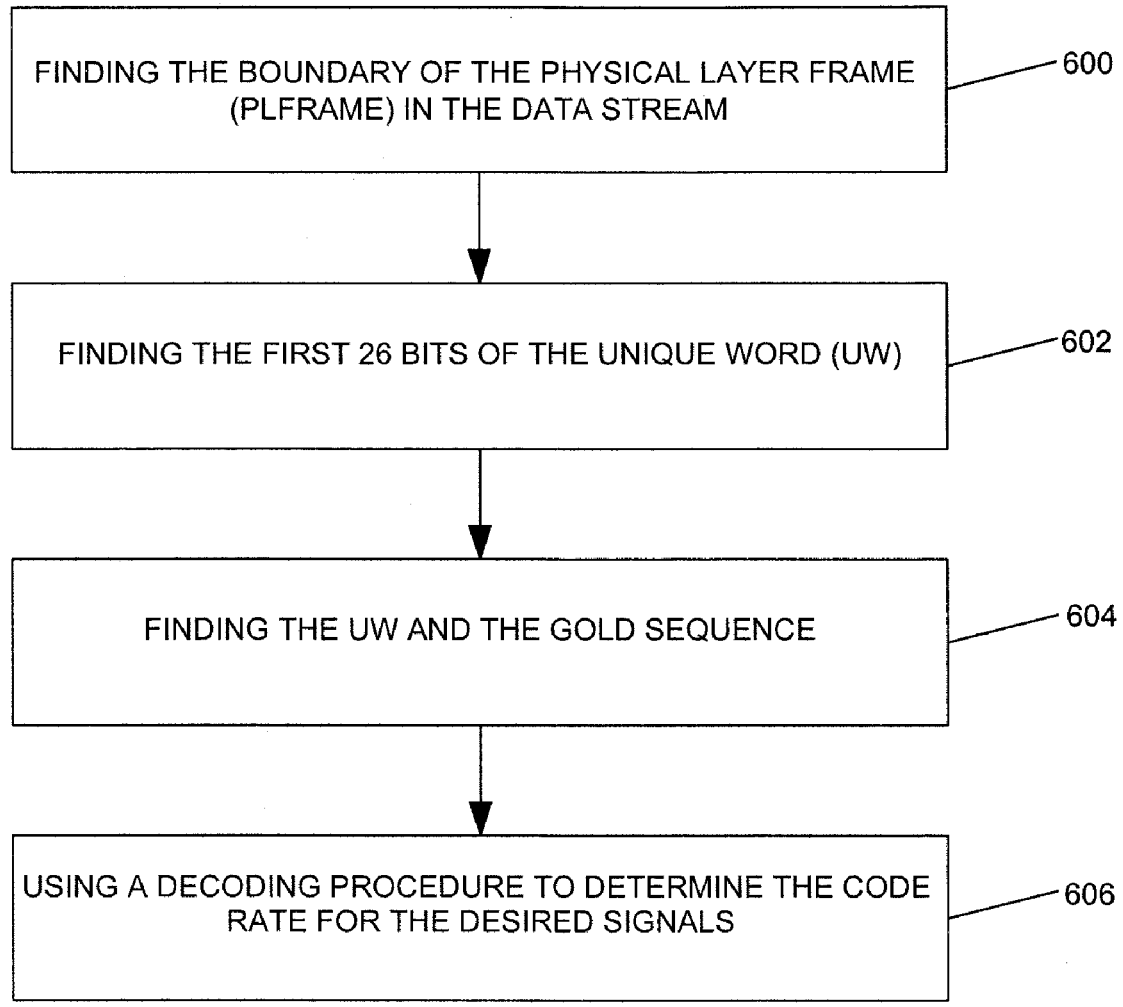
FIG. 6 is a flowchart showing the steps of the present invention.

FIG. 6 illustrates the process flow of the present invention.

Box 600 illustrates finding the boundary of the physical layer frame (PLFrame) in the data stream.

Box 602 illustrates finding the first 26 bits of the Unique Word (UW)

Box 604 illustrates finding the UW and the Gold sequence, i.e., the whole scrambling code.

Box 606 illustrates using a decoding procedure to determine the modulation type and code rate for the desired signals.

Finding The Boundary of the Physical Layer Frame

Even though each PLFrame 400 is scrambled by a scrambling code, the PLHeader 401 is always the same for each frame (unless the modulation or coding parameters are changed), and it will remain the same even after scrambling. This information can be used to identify the PLFrame 400 boundary.

To identify the coarse boundary, a frame length is chosen from the four possible cases, say L. Starting from the first symbol, a cross correlation is performed on some consecutive symbols, e.g., 90 symbols, which may change based on modulation and BBHeader information, with another 90 symbols which are delayed by L symbols. This process is followed through the full L symbols. When taking absolute values of the cross correlations, the true PLFrame 400 start position will be around the peak location. The symbol uncertainty range will be about [−35, 35], or about 71 symbols.

To identify the exact frame boundary, among the uncertainty range (say 71 totally), the information that the PLHeader 401 (90 symbols) is fixed is again used. If {s1, s2, . . . ,s90} are the symbols that comprise the PLHeader 401, s90*conjugate(s1) will be a fixed number for a fixed or slowly changing frequency offset and phase noise. Normalize s90*conjugate(s1) such that it has amplitude 1, e.g., the phase has not changed. For each start of frame within the uncertainty range, average the normalized s90*conjugate(s1) for some PLFrames 400, e.g., 50 PLFrames 400. Among the averages, the maximum peak amplitude is chosen. This is the true start of PL Frame 400 (SOF). When considering the impact of BB Header, we may use the threshold method to identify SOF.

Note that if the pilots are included in the desired carrier signal 118, the information that pilots are fixed for each PLFrame can be used to identify the SOF boundary more quickly.

Find the First 26 Bits of the UW

Once the exact PLFrame 400 boundary is found, use the information that the first 26 symbols of PLHeader 401 are independent of the modulation, code rate, pilots or no pilots, to identify the first 26 bits of the unique word 411. Once the first 26 bits of the unique word 411 are identified, the available scrambling code table is searched, typically resident in memory 224, to identify the scrambling codes (both unique word 411 and Gold code 500).

To find the first 26 bits of a unique word 411 once the Start of Frame, or SOF, is determined, for each SOF with phase and frequency uncertainty, normalize the first 26 symbols such that the first symbol always has a known phase. Then average each of the 26 symbols for certain period, say 100 PLFrames 400, to obtain 26 averaged symbols. If the averaged symbols are {t1, . . . ,t26} and the first 26 symbols of PLHeader 401 without scrambling is {h1, . . . ,h26}, rotate back {t1, . . . ,t26} by {h1, . . . ,h26} to get the new sequence {a1, . . . ,a26} where ai=ti/hi for i=1, . . . ,26. Now the sequence {a1, . . . ,a26} is the sequence {1-2*u1, . . . ,1-2*u26} with some frequency offset and phase offset. Since the frequency offset should be at most 25%, either a coherent or a non-coherent method can be applied to determine a sequence {v1, . . . ,v26}, which is {u1, . . . ,u26} or 1+{u1, . . . ,u26} mod 2, or a sequence {v1, . . . , v25}, which is {u2-u1, . . . ,u26 -u25} mod 2. This means that these sequences could be inverted with respect to the unique word 411, and these methods will also resolve this inversion.

Note that there are other methods to obtain the averaged symbol {t1, . . . ,t26} which is more accurate but requires more memory and more computation time. For example, if the first 90 header symbols are collected for two consecutive PLFrames 400, a cross correlation of the two sequences can be used to roughly find the phase rotation between the two headers. Normalize the second header symbols so that they have roughly the same phase as the first one. Similarly, for the last collected 90 header symbols, normalize them so that they have roughly the same phase as the first 90 header symbols. Now the first 26 symbols can be averaged to get {t1, . . . ,t26}.

Another efficient method can be depicted as follows. For each received 26 symbols {s1, . . . ,s26}, rotate the phase by {h1, . . . ,h26} to get a new symbol sequence, say {t1, . . . ,t26}. A sequence {x1, . . . ,x25} where |xi|=1 for i=1, . . . ,25 is then obtained, and the phase of xi is the phase difference of t(i+1) and ti. Average a certain number, say 100, of such vectors {x1, . . . ,x25} to find a new sequence {y1, . . . ,y25}. After normalizing vector {y1, . . . ,y25} by the phase of y1 and timing the sign of real(y1), {v1, . . . ,v25}, is obtained, which is {u2-u1, . . . ,u26-u25} mod 2. Other variations of these algorithms and techniques may be used without departing from the scope of the present invention.

Finding the Scrambling Code

To find the whole scrambling code once {v1, . . . ,v26} or {v1, . . . ,v25} is determined, compare the values obtained with those that would be obtained using each unique word 411, and the values that match determine the proper unique word 411. Since there is a one-to-one correlation between each unique word 411 and Gold code 500, the entire scrambling code is determined once the unique word 411 is located.

This identified combination can then be used to descramble the signal 118, and standard DBVS2 decoding procedures can determine the modulation type and code rate for the selected downlink signal 118.

Experimental Results

The method described with respect to FIG. 6 was tested using a series of simulations. For QPSK 9/10 mode without pilot symbols and scrambled using Scramble Code ID 17 (BB Header is not included in our simulation), a 25% frequency offset and AWGN such that CNR=1 dB were added. When the 90 symbols are cross-correlated, the peak contributed by the PLHeader 401 is very obvious. The simulation results indicate that the coarse frame boundary can be determined. For QPSK without pilots, the false detection probability is only about 0.0005. When the exact boundary method was used and 50 PLFrames were observed, the peak contributed by the exact SOF is easily observed. Thus, the exact SOF can be determined in less than 50 PLFrames 400 (including identification of coarse boundary and exact boundary). The false detection probability was found to be very small. The false detection probability is about 0.0005 for exact SOF detection, with the condition that the coarse boundary was correctly identified. Overall, the false detection probability is estimated to be about 0.001 based on 50 PL frames 400.

If the SOF boundary is known, the non-coherent method can be used to obtain sequence {v1, . . . ,v25} based on 100 PLFrames 400. Let u={u1, . . . ,u26} be the first 26 bits of the UW 411 with Scrambling ID 17. It was found that vi=abs(u (i+1)−ui) exactly for i=1, . . . ,25. It is expected that the coherent method will need fewer PLFrames 400 to achieve same performance. A full search of the possible 1016 currently identified unique words 411 demonstrated that none of their differential codes are the same, and at least two bits are different in each unique word 411.

Once the scrambling code is determined, the coarse frequency offset can be estimated based on the 26 SOF symbols. The pilots ON or OFF status is determined by the estimated frame length. After removing the coarse frequency offset, the code rate information can be extracted from the PLHeader 401 using a Reed-Muller decoder. After the above procedures, the demodulator/FEC 216 decoding ASIC, or, alternatively, the memory 224, can have all information for the desired carrier and the signal can be decoded correctly based on a predetermined Advanced Modulation and Coding specification.

It is expected that blind acquisition can be finished in about 120 PLFrames 400. Total demodulation acquisition (after AGC and Timing recovery) can be achieved in about 150 PLFrames 400, which is about 250 ms for QPSK modes and about 166 ms for 8PSK modes for a 20 MHz symbol rate, which would have a total false detection probability of less than 0.001. False detection can be achieved using the BCH error indicator or using the MPEG packet CRC results.

Other Applications of the Present Invention

Another application is that the proposed algorithm can be used to identify interference from unknown AMC or DVB-S2 signal sources. The idea can be roughly depicted as follows: The desired signal usually has strong power. After decoding, re-encoding and re-modulation, the desired signal can be removed from the mixed signals and only the interference signal and noise left. The interference signal can be identified as long as its Carrier to Noise Ratio (CNR) is above 0 dB. This compares with the less desired conventional technique which identifies the interference signal by dropping the desired signal.

CONCLUSION

In summary, the present invention comprises methods and apparatuses for acquiring and demodulating a data stream transmitted in a communication system. A method in accordance with the present invention comprises finding a boundary of a physical layer frame (PLFrame) in the data stream, finding a first 26 bits of a Unique Word (UW) associated with the data stream, finding a scrambling code utilizing the UW, and using a decoding procedure to determine a modulation type and code rate used for desired signals within the data stream.

Such a method further optionally includes the data stream being a downlink signal from a satellite, the scrambling code further comprising a Gold code used to scramble a payload portion of the data stream, finding the boundary of the PLFrame further comprises finding a coarse boundary of the PLFrame, finding the boundary of the PLFrame further comprises finding a Start Of Frame (SOF) of the PLFrame, finding the SOF comprises normalizing a conjugate product of a last symbol of a PLHeader and a first symbol of the PLHeader, finding the first 26 bits of the UW comprises normalizing the first 26 symbols of the data stream after the SOF such that a first symbol has a known phase, and finding a scrambling code comprises looking up the scrambling code associated with the UW.

An apparatus in accordance with the present invention acquires and demodulates a data stream transmitted in a communication system, and comprises a demodulator for finding a boundary of a physical layer frame in the data stream and for finding a first 26 bits of a unique word associated with the data stream, a descrambler, coupled to the demodulator, for finding a scrambling code utilizing the unique word, and a decoder, coupled to the descrambler, for determining a modulation type and code rate used for desired signals within the data stream and for decoding the data stream.

Such an apparatus further optionally includes the data stream being a downlink signal from a satellite, the scrambling code further comprising a Gold code used to scramble a payload portion of the data stream, finding the boundary of the physical layer frame further comprising finding a coarse boundary of the physical layer frame, finding the boundary of the physical layer frame further comprising finding a start-of-frame of the physical layer frame, finding the start-of-frame comprising normalizing a conjugate product of a last symbol of a physical layer header and a first symbol of the physical layer header, finding the first 26 bits of the unique word comprises normalizing the first 26 symbols of the data stream after the start-of-frame such that a first symbol has a known phase, and finding a scrambling code comprises looking up the scrambling code associated with the unique word.

A system embodiment in accordance with the present invention transmits and receives a data stream, and comprises a transmitter, the transmitter further comprising an encoder, the encoder accepting the data stream and generating an encoded version of the data stream including a physical layer header and a payload portion, a scrambler, coupled to the encoder, for accepting the encoded version of the data stream and creating a scrambled version of the data stream, and a modulator, coupled to the encoder, for modulating the scrambled version of the data stream onto a carrier; and a receiver, the receiver further comprising a demodulator for finding a boundary of a physical layer frame in the scrambled version of the data stream and for finding a first 26 bits of a unique word associated with the scrambled version of the data stream a descrambler, coupled to the demodulator, for applying a scrambling code to the scrambled version of the data stream utilizing the unique word to re-create the encoded version of the data stream, and a decoder, coupled to the descrambler, for decoding the encoded version of the data stream using a modulation type and code rate that extracts desired signals within the data stream.

Such a system further optionally includes scrambling the encoded version of the data stream which scrambles only the payload portion of the encoded version of the data stream, the data stream being a downlink signal from a satellite, and the scrambling code further comprising a Gold code used to scramble a payload portion of the data stream.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A method for acquiring and demodulating a data stream transmitted in a communication system, comprising:
   finding a boundary of a physical layer frame (PLFrame) in the data stream;
   finding a first 26 bits of a Unique Word (UW) associated with the data stream;
   finding a scrambling code utilizing the UW; and
   using a decoding procedure to determine a modulation type and code rate used for desired signals within the data stream.

2. The method of claim 1, wherein the data stream is a downlink signal from a satellite.

3. The method of claim 2, wherein the scrambling code further comprises a Gold code used to scramble a payload portion of the data stream.

4. The method of claim 3, wherein finding the boundary of the PLFrame further comprises finding a coarse boundary of the PLFrame.

5. The method of claim 4, wherein finding the boundary of the PLFrame further comprises finding a Start Of Frame (SOF) of the PLFrame.

6. The method of claim 5, wherein finding the SOF comprises normalizing a conjugate product of a last symbol of a physical layer header and a first symbol of the physical layer header.

7. The method of claim 6, wherein finding the first 26 bits of the UW comprises normalizing the first 26 symbols of the data stream after the SOF such that a first symbol has a known phase.

8. The method of claim 7, wherein finding a scrambling code comprises looking up the scrambling code associated with the UW.

9. An apparatus for acquiring and demodulating a data stream transmitted in a communication system, comprising:
a demodulator for finding a boundary of a physical layer frame in the data stream and for finding a first 26 bits of a unique word associated with the data stream;
a descrambler, coupled to the demodulator, for finding a scrambling code utilizing the unique word; and
a decoder, coupled to the descrambler, for determining a modulation type and code rate used for desired signals within the data stream and for decoding the data stream.

10. The apparatus of claim 9, wherein the data stream is a downlink signal from a satellite.

11. The apparatus of claim 10, wherein the scrambling code further comprises a Gold code used to scramble a payload portion of the data stream.

12. The apparatus of claim 11, wherein finding the boundary of the physical layer frame further comprises finding a coarse boundary of the physical layer frame.

13. The apparatus of claim 12, wherein finding the boundary of the physical layer frame further comprises finding a start-of-frame of the physical layer frame.

14. The apparatus of claim 13, wherein finding the start-of-frame comprises normalizing a conjugate product of a last symbol of a physical layer header and a first symbol of the physical layer header.

15. The apparatus of claim 14, wherein finding the first 26 bits of the unique word comprises normalizing the first 26 symbols of the data stream after the start-of-frame such that a first symbol has a known phase.

16. The apparatus of claim 15, wherein finding a scrambling code comprises looking up the scrambling code associated with the unique word.

17. A system for transmitting and receiving a data stream, comprising:
a transmitter, the transmitter further comprising:
an encoder, the encoder accepting the data stream and generating an encoded version of the data stream including a physical layer header and a payload portion;
a scrambler, coupled to the encoder, for accepting the encoded version of the data stream and creating a scrambled version of the data stream; and
a modulator, coupled to the encoder, for modulating the scrambled version of the data stream onto a carrier; and
a receiver, the receiver further comprising:
a demodulator for finding a boundary of a physical layer frame in the scrambled version of the data stream and for finding a first 26 bits of a unique word associated with the scrambled version of the data stream;
a descrambler, coupled to the demodulator, for applying a scrambling code to the scrambled version of the data stream utilizing the unique word to re-create the encoded version of the data stream; and
a decoder, coupled to the descrambler, for decoding the encoded version of the data stream using a modulation type and code rate that extracts desired signals within the data stream.

18. The system of claim 17, wherein scrambling the encoded version of the data stream scrambles only the payload portion of the encoded version of the data stream.

19. The system of claim 18, wherein the data stream is a downlink signal from a satellite.

20. The system of claim 19, wherein the scrambling code further comprises a Gold code used to scramble a payload portion of the data stream.

* * * * *